United States Patent [19]

Baer

[11] Patent Number: 4,761,786
[45] Date of Patent: Aug. 2, 1988

[54] MINIATURIZED Q-SWITCHED DIODE PUMPED SOLID STATE LASER

[75] Inventor: Thomas M. Baer, Mountain View, Calif.

[73] Assignee: Spectra-Physics, Inc., San Jose, Calif.

[21] Appl. No.: 945,609

[22] Filed: Dec. 23, 1986

[51] Int. Cl.[4] .................. H01S 3/11; H01S 3/117; H01S 3/092
[52] U.S. Cl. ...................... 372/10; 372/13; 372/71; 372/72
[58] Field of Search ............... 372/10, 13, 69, 71, 372/72, 108, 92, 98

[56] References Cited

U.S. PATENT DOCUMENTS

| 3,949,319 | 4/1976 | Tofield et al. | 372/41 |
| 4,308,506 | 12/1981 | Ellis | 372/13 |
| 4,653,056 | 3/1987 | Baer et al. | 372/27 |

FOREIGN PATENT DOCUMENTS 0094786 5/1985 Japan .................... 372/10

OTHER PUBLICATIONS

Egorov et al., "Single-Frequency Q-Switch Neodymium Laser", Sov. J. Quant. Electron, vol. 5, No. 3, 1975, pp. 291-293.

Primary Examiner—James W. Davie
Assistant Examiner—Georgia Y. Epps
Attorney, Agent, or Firm—Paul Davis

[57] ABSTRACT

A miniaturized Q-switch is added to the resonant cavity of a compact laser diode pumped solid state laser to produce short high peak power pulses. Q-switching the compact diode pumped solid state lasers takes advantage of the relatively high gain and short cavity length to provide a desirable combination of pulsewidth and pulse energy. Nd:YAG or Nd:YLF are useful solid state laser materials for Q-switching, or other longer lifetime rare earth ions such as erbium or holmium for greater energy storage. The Q-switch is formed of a material such as $TeO_2$, $SF_{10}$, or $LiNbO_3$ with an acoustooptic figure of merit substantially greater than fused silica. Pulsewidths of 10-50 ns are achieved at pulse energies of 10-20 microjoules. TEM00 output is easily produced by the compact laser pumped solid state resonator. Applications include materials processing, link blowing in semiconductor memories, marking and scribing, and optical time domain reflectometry.

20 Claims, 1 Drawing Sheet

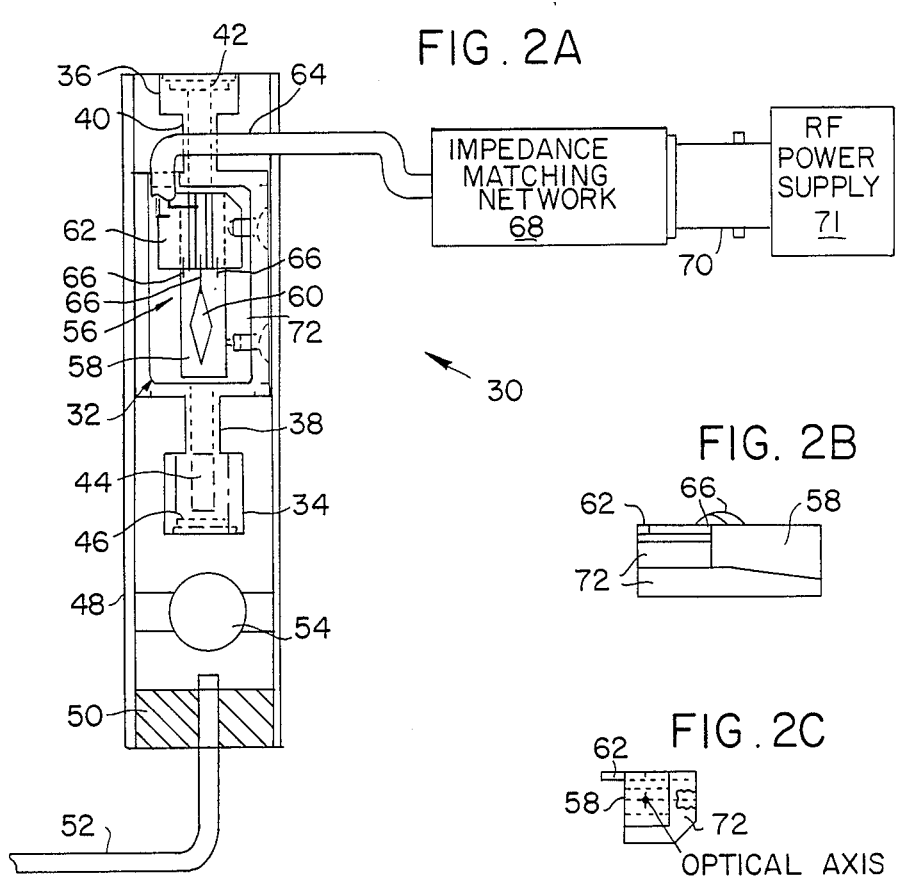
FIG. 2A
FIG. 2B
FIG. 2C
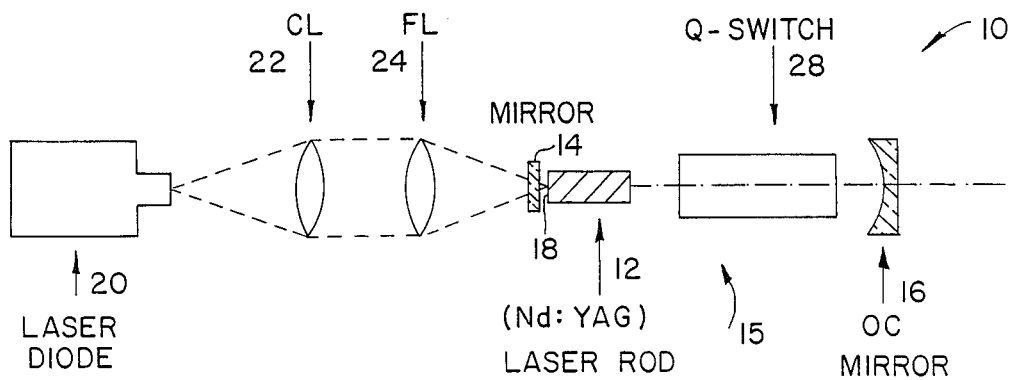
FIG. 1

MINIATURIZED Q-SWITCHED DIODE PUMPED SOLID STATE LASER

BACKGROUND OF THE INVENTION

The invention relates generally to solid state lasers and more particularly to Q-switched lasers for producing high peak power pulses.

Q-switching is a technique used to obtain high peak power laser pulses. Q-switching is performed by modulating the losses in a laser cavity. When cavity loss is high, pumping energy is stored in the laser gain medium by building up the population inversion; the high cavity loss prevents laser action from occurring which would deplete the stored energy. The stored energy is then extracted in a high peak power pulse by reducing the cavity losses. The use of an acousto-optic modulator inside a laser cavity for Q-switching is described in Chang, "Acousto-optic Devices and Applications," *IEEE Transactions on Sonics and Ultrasonics*, Vol. SU-23, No. 1, January 1976 on page 17. However, as noted therein nearly all acousto-optic Q-switches are made of fused silica. Another concern mentioned therein is the substantial RF power that must be applied to the Q-switch to prevent lasing.

U.S. patent applications Ser. No. 730,002 filed May 1, 1985, now U.S. Pat. No. 4,653,056 issued Mar. 14, 1987 and Ser. No. 811,546 filed Dec. 19, 1985, now U.S. Pat. No. 4,656,635 issued Apr. 7, 1987 describe a class of solid state lasers which are laser diode pumped in a longitudinal pumping configuration and which can be pumped in the TEM00 mode. These solid state lasers can be made extremely compact. U.S. patent application Ser. No. 864,928 filed May 19, 1986, now U.S. Pat. No. 4,665,529 issued May 12, 1987 describes a fiber optic coupled longitudinal pumping scheme which provides further miniaturization of these solid state lasers. In these lasers mode matching of the laser diode pumping source to the active mode volume of the laser cavity provides for high gain in a small volume.

These solid state lasers are efficient wavelength and mode converters for diode lasers. Diode pumped lasers do not use cooling water and do not rely on broadband excitation sources. Therefore they are not subject to water or flashlamp induced noise and exhibit greatly reduced thermal lensing. These characteristics result in excellent beam pointing stability and pulse-to-pulse stability. It is desirable to obtain these advantages in a Q-switched laser.

The typical prior art Q-switched solid state laser cannot produce the desired combination of peak power and short pulse width. A long laser rod is pumped by tungsten or arc lamps. A fused silica Q-switch is also placed in the laser cavity and powered from an RF source connected to a LiNbO$_3$ transducer mounted to the silica substrate. The cavity is relatively long, typically about 1 foot and the Q-switch is large.

To form short pulses, either a short cavity or increased gain in the cavity is required, since pulse width depends on the product of gain and cavity round trip time. For a 1 foot cavity, the round trip time is about two ns. To obtain high gain in the cavity to compensate for the long cavity length, the gain medium must be very highly pumped. Typically several KW of power are supplied to the arc lamp used to pump the laser rod (since pumping efficiency is only about 5%). However the higher gain required to obtain a desired pulse width can result in too high a pulse intensity since the total energy (product of power and pulse width) in the pulse is approximately constant and peak power increases as pulse width decreases. Therefore there is a tradeoff in obtaining the pulsewidth-energy desired. Thus, the usual results are the right peak power out too long a pulse or a sufficiently short pulse at too high peak power.

It is desirable to produce a more effective short pulse Q-switched solid state laser which provides a short pulse at low energy by using a short cavity at moderate gain instead of a longer cavity at very high gains. The aforementioned class of solid state lasers, described in the above cited patent applications, allow the resonator to be made small, typically about 1 inch long, while the efficient longitudinal diode-pumped arrangement (about 30% efficient) provides for a reasonable gain. The output can also easily be produced in TEM00 mode which is useful for many applications. Thus it will be desirable to incorporate a Q-switch into this type of solid state laser so that very short pulses can be produced at desired low energy levels but still with relatively high peak power. It is also desirable to utilize nonstandard materials for the Q-switch in order to produce a miniaturized Q-switch which fits into such a short cavity with low power pumping requirements.

SUMMARY OF THE INVENTION

Accordingly, it is an object of the invention to produce a compact cavity, longitudinally diode-pumped, Q-switched solid state laser.

It is also an object of the invention to produce a Q-switched solid state laser having a relatively high gain in a relatively short cavity.

It is a further object of the invention to produce a Q-switch solid state laser having pulse widths of 50 ns or less.

It is another object of the invention to find a number of different materials for a Q-switch for a compact solid state laser.

The invention is a laser diode pumped Q-switched solid state laser which has a short cavity length for producing very short high peak power pulses. Laser diodes are used to longitudinally end pump a rod of Nd:YAG or Nd:YLF or some other solid state material so that a small high gain cavity is produced. The cavity can be pumped to produce TEM00 mode. A small acousto-optic Q-switch made of TeO$_2$, SF$_{10}$ or LiNbO$_3$ or other material with a high acousto-optic figure of merit is also placed in the compact cavity so that stored energy in the cavity can be extracted in a short pulse. The Q-switched output has applications for materials processing, link blowing in semiconductor memories, marking and scribing, or optical time domain reflectivity.

BRIEF DESCRIPTION OF THE DRAWINGS

In the Figures:

FIG. 1 is a schematic sectional view of a laser diode pumped Q-switched solid state laser oscillator.

FIGS. 2A to 2C are sectional views of a miniaturized Q-switch in a solid state laser cavity.

DETAILED DESCRIPTION OF THE PREFERRED EMBODIMENT

A diode pumped Q-switched solid state laser oscillator 10 is shown in FIG. 1. A solid state laser rod 12 is mounted between a pair of aligned mirrors 14, 16 to form a resonator cavity 15. Mirror 16 is the output coupling mirror which is partly transmitting to the laser radiation. Mirror 14 is highly reflective to the laser radiation but transmissive to the pumping radiation. In an alternate embodiment the mirror 14 may be formed on the end face 18 of the laser rod 12. By separating mirror 14 from the end of laser rod 12 by a few millimeters the laser power is increased about 20% by eliminating spatial hole burning in the rod. A laser diode pumping source 20 is mounted to provide pumping radiation to laser rod 12. The pumping source 20 is a laser diode or laser diode array. The output of pumping source 20 is collected by a collimating lens 22 which is followed by a focussing lens 24 which longitudinally pumps laser rod 12. Other lenses to correct astigmatism may be placed between lenses 22, 24. In an alternate embodiment, the diode pumping source 20 is not mounted directly to the resonator cavity 15 but may be placed remotely and the pumping radiation transmitted through an optical fiber (as shown in FIG. 2A), which is coupled to the resonator cavity 15 to longitudinally end pump the laser rod. These solid state laser configurations are in accordance with the principles and designs of U.S. patent applications Ser. Nos. 730,002 filed May 1, 1985, now U.S. Pat. No. 4,653,056 issued Mar. 14, 1987, 811,546 filed Dec. 19, 1985, now U.S. Pat. No. 4,656,635 issued Apr. 7, 1987, and 864,928 filed May 19, 1986, now U.S. Pat. No. 4,665,529 issued May 12, 1987, which are herein incorporated by reference.

An acousto-optic Q-switch 28 is also placed in the cavity 15. Q-switch 15 provides a time dependent loss in cavity 15. An acoustic wave is produced in Q-switch 28 by applying an RF wave to a piezoelectric transducer mounted on a substrate creating a diffraction grating in the material which introduces a loss in the cavity so that rod 12 can be pumped without lasing. When the RF wave is turned off there is no longer an acoustic diffraction grating in the material so that lasing in the cavity occurs with the stored energy being dumped into a short high peak power pulse. In addition to acousto-optic elements, the Q-switch 28 could also be formed of an electro-optic element which changes its polarized state relative to a polarizer in the cavity to provide the time dependent cavity loss.

In accordance with the principles and teachings of the invention, the solid state laser cavity can be made small and the acousto-optic Q-switch can be made of a material so that it also can be made small so that it fits into the short cavity. In addition, by the longitudinal end pumped pumping scheme, the gain in the short cavity can be relatively high so that very short pulses can be produced at a desired peak power level.

The laser rod can be made of Nd:YAG which produces an output at 1.06 microns. The laser rod could alternately be made of Nd:YLF which has a longer fluorescence lifetime than Nd:YAG (480 microsec compared to 230 microsec) so that more energy can be stored. In general, the longer the lifetime of the excited states in the gain material, the greater population inversion can be stored while the Q-switch prevents lasing and the higher energy output will be obtained. Thus, longer lifetime rare earth ions could be used in place of Nd; for example Erbium (Er) or Holmium (Ho) could be used.

In order to build a small Q-switch, nonstandard materials must be used. Chang, page 7, Table I, which is herein incorporated by reference, lists a number of acousto-optic materials with their figures of merit. A small Q-switch will allow a shorter laser cavity for shorter pulses and also require lower RF power. The acousto-optic figure of merit is a measure of the extent to which diffraction is produced for a given amount of electrical energy. The higher the figure of merit, the shorter length of material is required. Preferred materials for the Q-switch of the invention include $TeO_2$, $SF_{10}$ and $LiNbO_3$, but any material with an acousto-optic figure of merit substantially greater than fused silica could be used. Alternatively, a Q-switch of electo-optic material could also be used.

An illustrative embodiment of a miniaturized Q-switched solid state laser cavity 30 is shown in FIGS. 2A to 2C. The Q-switched cavity 30 is contained in a substantially tubular resonator housing 32. The resonator housing 32 has a pair of end portions 34, 36 which extend out from narrow neck portions 38, 40. Output coupling mirror 42 is mounted in end portion 36 of housing 32 while the solid state laser rod 44 and cavity end mirror 46 are mounted in end portion 34. Mirrors 42 and 46 define the optical cavity; by bending the narrow portions 38, 40 of housing 32 optical alignment of the mirrors 42, 46 can be performed. As previously described, mirror 46 can be separate from laser rod 44 or can be formed on the end surface of the rod 44. The resonator housing 32 may be mounted in an outer laser housing 48 which contains fiber connector 50 which couples optical fiber 52 to the housing 48 to longitudinally end pump laser rod 44 from a remote laser diode pump source. The coupling connector 50 maintains fiber 52 in the proper relationship with any associated focusing optics 54 mounted in housing 48, to efficiently pump rod 44. Alternatively, the laser diode pumping source can be mounted directly in housing 48.

A miniaturized Q-switch 56 is mounted in the compact laser resonator housing 32. Q-switch 56 is made of a substrate 58 in which is mounted a small (diamond-shaped) piezoelectric transducer 60, typically made of $LiNbO_3$. A stripline 62 provides electrical connection from a coaxial cable 64 to transducer 60 (through contacts 66). The coaxial cable is connected through impedance matching network 68 to an electrical connector 70 which is connected to a RF power supply 71. Matching network 68 prevents reflections at the load and provides for efficiently driving the piezoelectric transducer 60. The Q-switch substrate 58, as shown in the side and end views of FIGS. 2B and 2C, is canted or wedge shaped so that acoustic waves propagated though substrate 58 are not reflected back on themselves. The substrate 58 is also surrounded by an L-shaped heat sink 72 which attaches to the housing 32. In operation an RF signal is input through coaxial cable 64 to transducer 60 to generate an acoustic wave which is propagated through substrate 58 to produce a diffraction grating along the optical axis of the solid state laser resonant cavity. When the diffraction grating is present, the losses prevent lasing and allow energy to be stored in the laser rod 44. When the diffraction grating is removed, the laser produces a short high peak power pulse.

By Q-switching these small diode pumped solid state oscillators high peak short pulse width output pulses are obtained. For Nd:YAG 10 microJoule energy pulses have been obtained, while Nd:YLF has produced 20 microJoule energy pulses, at repetition rates of 1 Hz to 20 KHz, and with pulse widths of 10–50 ns. There lasers offer exceptional beam pointing stability and pulse energy stability, with beam pointing stability on the order of ±1% of the diffraction limited spot size over 10 minute time spans, and pulse to pulse stability of ±3% peak to peak. More stable performance can be achieved by a mode selection technique based on Q-switch control in which one mode is allowed to gain switch before the cavity is opened. By reducing the Q-switch RF drive level, and allowing one CW mode to oscillate, pulse stabilities of ±1.5% are achieved. Addition of an intra-cavity etalon to allow for drift in RF levels yields ±1% stability (but would require stabilization of the cavity if used over long periods of time).

Q-switched diode pumped solid state lasers give pulse widths and power levels useful for a variety of applications. The benefits of high efficiency, extended life (10,000 hours if the diode is operated at −20C), excellent beam pointing staoility and pulse energy stability make them particularly attractive. The ability to produce TEM00 mode is also advantageous, particularly for focussing to a small spot without mode structure. One application is materials processing, in particular link blowing in semiconductor memories. It is necessary to focus the beam to a 1 micron spot, for which TEM00 mode is particularly suitable. In order to burn out the aluminum or tungsten silicate links, pulse to pulse stability is required. Another application is marking or scribing on discrete semiconductor components, printed circuit boards, silk screens and a wide variety of other materials. A pulse of about 20 ns could oe used to perform optical time domain reflectometry (OTDR) in which a pulse is propagated through a long optical fiber cable to detect defects.

Changes and modifications in the specifically described embodiments can oe carried out without departing from the scope of the invention which is intended to be limited only by the scope of the appended claims.

I claim:

1. A compact Q-switched solid state laser for producing short high peak power pulses, comprising:
   a miniaturized solid state laser rod;
   cavity forming means for defining a compact resonant cavity which contains the laser rod, said cavity forming means including output coupling means for extracting laser pulses from the cavity;
   laser diode pumping means positioned to longitudinally end pump the laser rod and to match the pumping volume to the mode volume in the laser rod;
   a miniaturized Q-switch mounted in the resonant cavity in a position to introduce a loss in the cavity so the rod can be pumped to store energy without lasing, and to remove the loss so that lasing in the cavity occurs with stored energy being dumped into a short high peak power pulse.

2. The laser of claim 1 wherein the laser rod is selected from Nd:YAG and Nd:YLF.

3. The laser of claim 1 wherein the laser rod is made of a solid state laser material doped with a rare earth ion selected from erbium and holmium.

4. The laser of claim 1 wherein the pumping volume is matched to the mode volume to produce TEM00 output.

5. The laser of claim 1 further including an optical fiber connected to the laser diode pumping means and coupling means for connecting the optical fiber to the resonant cavity in a fixed relationsnip for pumping the laser rod.

6. The laser of claim 1 wnerein the Q-switch is a miniaturized acousto-optic Q-switch.

7. The laser of claim 6 wherein the acousto-optic Q-switch comprises a substrate of material having an acoustooptic figure of merit greater than fused silica positioned on the optical axis of the resonant cavity, a piezoelectric transducer mounted to the substrate, and means for connecting the piezoelectric transducer to an RF source to drive the transducer and generate an acoustic diffraction grating in the substrate.

8. The laser of claim 7 wnerein the substrate is selected from $TeO_2$, $SF_{10}$, and $LiNbO_3$.

9. The laser of claim 1 for producing pulses having pulsewidths in the range of about 10–50 ns.

10. A method of producing a short high peak power pulse, comprising:
    forming a compact solid state laser resonator with a miniaturized solid state laser rod;
    pumping the laser rod with a laser diode pumping source;
    matching the pumping volume to the mode volume in the laser rod;
    creating an acoustic diffraction grating in a miniaturized Q-switch in the resonant cavity to prevent lasing while energy is stored in the laser rod;
    turning off the acoustic diffraction grating to extract the stored energy in the laser rod in a short high peak power pulse.

11. The method of claim 10 including forming the laser rod from Nd:YAG or Nd:YLF.

12. The method of claim 10 including forming the miniaturized Q-switch from a material having an acoustooptic figure of merit substantially greater than fused silica.

13. The method of claim 12 including forming the Q-switch from $TeO_2$, $SF_{10}$, or $LiNbO_3$.

14. The method of claim 10 further including forming pulses having a pulsewidth of about 10–50 ns.

15. The method of claim 14 further comprising forming a plurality of pulses and focussing the pulses on a semiconductor memory to perform link blowing.

16. The method of claim 14 further comprising forming a plurality of pulses and focussing the pulses on a material to mark or scribe the material.

17. The method of claim 14 further including propagating a pulse down a long optical fiber to perform optical time domain reflectometry.

18. The method of claim 10 further including matching the pumping volume to the mode volume to produce TEM00 output.

19. A miniaturized acousto-optic Q-switch for a compact solid state laser, comprising;
    a substrate of a material having an acoustooptic figure of merit greater than fused silica;
    a piezoelectric transducer mounted to the substrate;
    means for connecting the transducer to an RF power supply.

20. The Q-switch of claim 19 wnerein the substrate is selected from $TeO_2$, $SF_{10}$, and $LiNbO_3$.

* * * * *